United States Patent
Cheng

(10) Patent No.: US 12,380,574 B2
(45) Date of Patent: Aug. 5, 2025

(54) METHOD AND DEVICE FOR IDENTIFYING FACE OF ONE PERSON AMONG MANY AND TRACKING SAME AS THE TARGET

(71) Applicant: Nanning FuLian FuGui Precision Industrial Co., Ltd., Nanning (CN)

(72) Inventor: Ming-Chieh Cheng, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 394 days.

(21) Appl. No.: 18/076,293

(22) Filed: Dec. 6, 2022

(65) Prior Publication Data
US 2023/0351611 A1 Nov. 2, 2023

(30) Foreign Application Priority Data

Apr. 29, 2022 (CN) .......................... 202210473041.7

(51) Int. Cl.
*G06T 7/20* (2017.01)
*G01S 13/06* (2006.01)
*G06V 40/16* (2022.01)

(52) U.S. Cl.
CPC ................ *G06T 7/20* (2013.01); *G01S 13/06* (2013.01); *G06V 40/161* (2022.01)

(58) Field of Classification Search
CPC ............. G06T 7/20; G06T 2207/30201; G06T 2207/10044; G06T 2207/10024; G06T 2207/10028; G01S 13/06; G01S 13/723; G01S 13/867; G06V 40/161; G06V 40/10; G06V 10/58
See application file for complete search history.

(56) References Cited

U.S. PATENT DOCUMENTS

| 2005/0063566 A1 | 3/2005 | Beek et al. |
| 2018/0091730 A1 | 3/2018 | Nixon et al. |

FOREIGN PATENT DOCUMENTS

| CN | 103475849 A | * | 12/2013 | |
| CN | 105657369 A | | 6/2016 | |
| CN | 111928775 A | * | 11/2020 | |
| CN | 109068090 B | | 3/2021 | |
| CN | 114401371 A | | 4/2022 | |
| KR | 20160017400 A | * | 2/2016 | |
| TW | 201710772 A | | 3/2017 | |
| TW | 202032420 A | | 9/2020 | |
| WO | WO-2018152009 A1 | * | 8/2018 | ........... A61B 5/0205 |

* cited by examiner

*Primary Examiner* — Ming Y Hon
*Assistant Examiner* — Dominique James
(74) *Attorney, Agent, or Firm* — ScienBiziP, P.C.

(57) ABSTRACT

A method for tracking a moving human target and a device, the target tracking device comprises radar unit and camera unit. The method first obtains first positional information of a target through the radar unit, then obtains a display area image comprising the target through the camera unit based on the first positional information. Upon determining the target as human, the method determines whether an initial position of face of the target is centered within the display area image. If not centered, compensation is continuously applied to the radar unit from calculations on information as to orientations and distances from the radar unit and the camera unit, the radar unit and the camera unit being controlled to conduct face tracking of the moving target.

8 Claims, 8 Drawing Sheets

METHOD AND DEVICE FOR IDENTIFYING FACE OF ONE PERSON AMONG MANY AND TRACKING SAME AS THE TARGET

FIELD

The subject matter herein generally relates to image processing technology, and more particularly, to a method and an apparatus for tracking one person as a target.

BACKGROUND

In existing target tracking systems, directional microphones can be used to detect the location of a speaker in a video conference. However, directional microphones can be often disturbed by echoes and distances, and are only effective in small video conferences with few people.

To improve the interactivity and experience of video conferences, solutions are needed.

BRIEF DESCRIPTION OF THE DRAWINGS

Implementations of the present technology will now be described, by way of embodiment, with reference to the attached figures, wherein.

DETAILED DESCRIPTION

Figure 1:
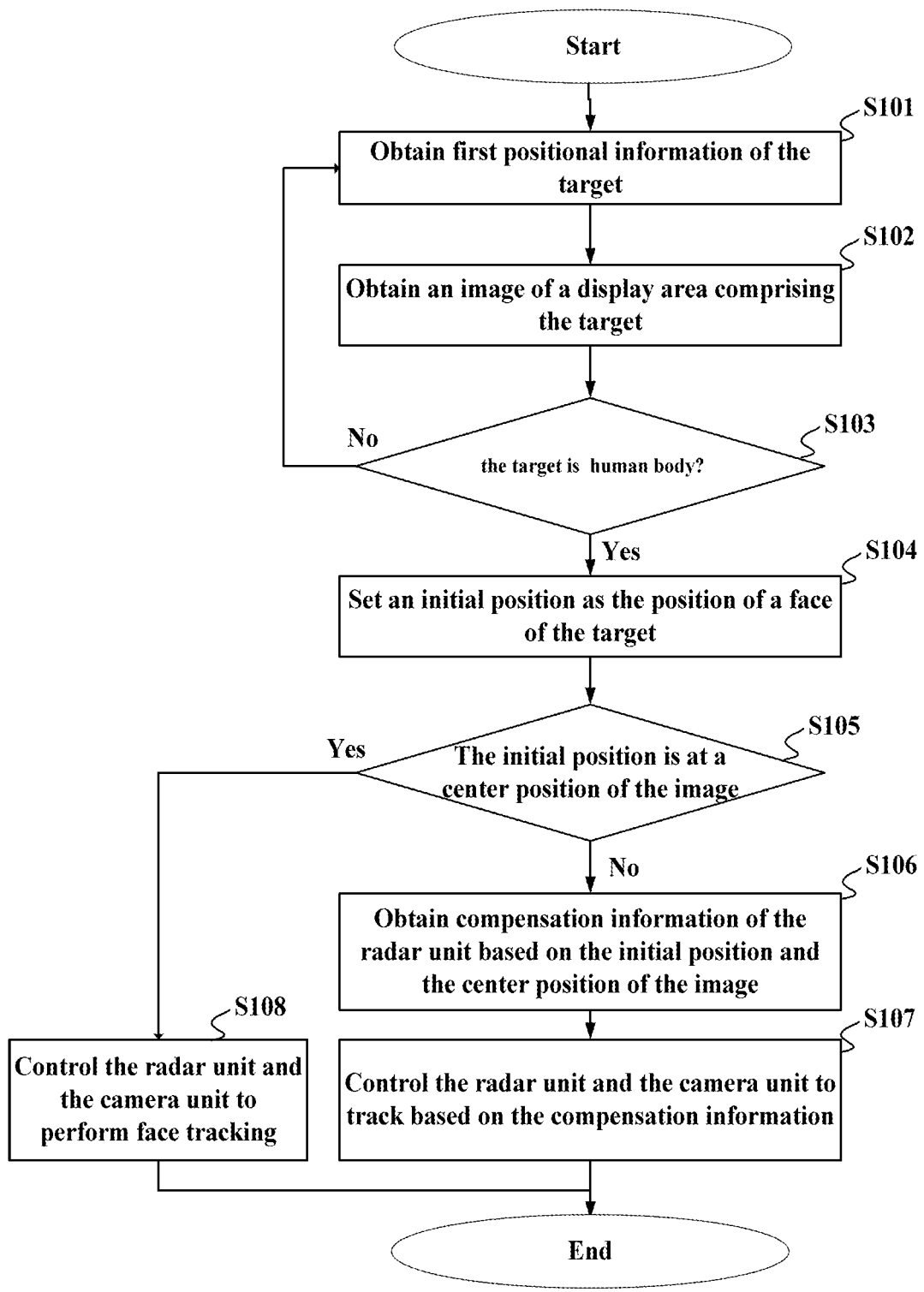
FIG. 1 is a flowchart of one embodiment of a method for tracking a target.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates a method for identifying and tracking a target, according to an embodiment. The method is applied in a tracking device, which comprises a radar unit and a camera unit. In one embodiment, the radar unit is electrically connected to the camera unit and is integrated in the target tracking device. In other embodiments, the radar unit or the camera unit may be a separate device from the target tracking device, and the radar unit may be connected to the camera unit through various communication links, such as wired or wireless communication links or fiber optic cables. The target tracking device may be any electronic device with camera and radar detection functions, such as video conferencing and surveillance functions.

Step S101, the target tracking device detects a target which may be in motion using the radar unit and obtains first positional information of the moving target.

The radar device first detects the presence of any moving targets. When a plurality of moving targets is detected, the positional information of the moving target with the greatest amount of movement is used as the first positional information.

Step S102, the target tracking device obtains an image to focus on a display area comprising the target, through the camera unit based on the first positional information.

The target tracking device adjusts the focus of the camera unit according to the first positional information to obtain a clear image of the display area comprising the target.

Step S103, the target tracking device determines whether the target is a human body based on the image of the display area.

To exclude targets which are not human, the target tracking device uses image analysis techniques to determine whether the target imaged by the camera unit is a human body. If the target tracking device determines that the moving object is not a human body, it returns to step S101, and continues to detect the moving object using the radar unit until a human body is detected as the target. If the target tracking device determines that the moving object is a human body, it performs step S104.

Step S104, the target tracking device sets an initial position to represent the face of the human target in the image of the display area.

The target tracking device uses face recognition technologies to determine the position of the face of the target.

Step S105, the target tracking device determines whether the initial position is at a center position of the image of the display area.

If the target tracking device determines that the initial position is not at the center of the image of the display area, it performs step S106. If the target tracking device determines that the initial position is at the center position of the image of the display area, it performs step S108.

Step S106, the target tracking device obtains information to apply compensation to the radar unit based on the initial position and the center position of the image of the display area.

Step S107, the target tracking device controls the radar unit and the camera unit to perform face tracking on the target based on the compensation information.

Step S108, the target tracking device controls the radar unit and the camera unit to perform face tracking on the target.

Figure 2:
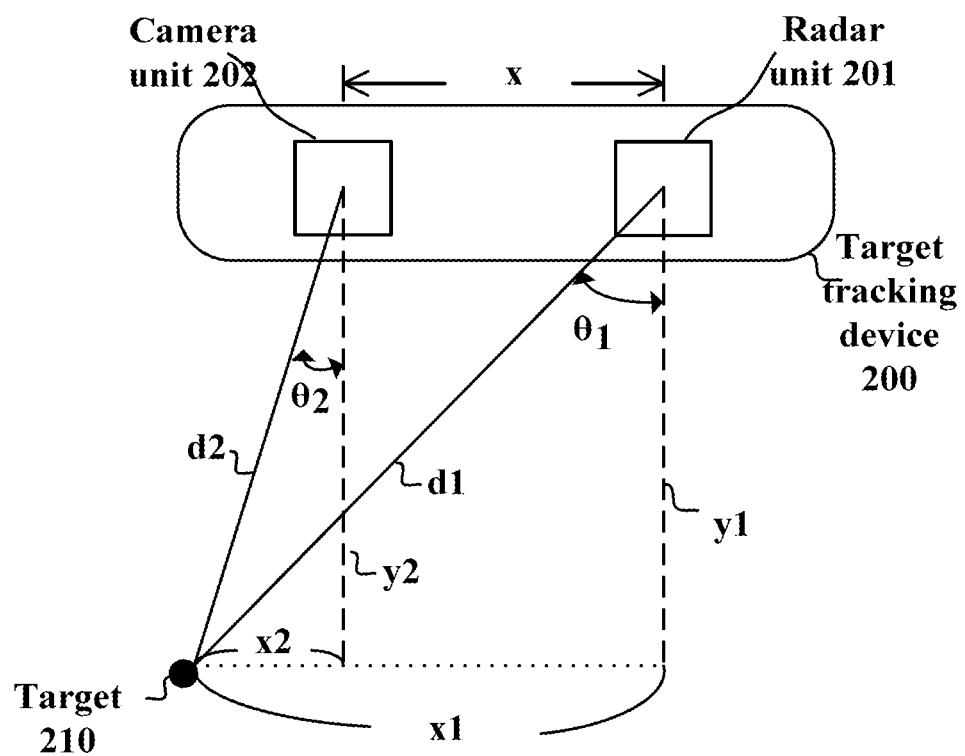
FIG. 2 is a schematic diagram of one embodiment of an apparatus in operation for tracking a target.

FIG. 2 illustrates operations of the target tracking device 200.

As shown in FIG. 2, the target tracking device 200 comprises a radar unit 201 and a camera unit 202. The distance between the radar unit 201 and the camera unit 202 is x. The directions directly in front of the radar unit 201 and the camera unit 202 are used as reference directions of the angles. The target 210 is detected by the radar unit 201, and the first positional information of the target 210 is obtained, wherein the first positional information comprises distance $d_1$ between the target 210 and the radar unit 201, and an orientation $\theta_1$ of the target 210 with respect to the direction directly in front of the radar unit 201. The horizontal distance $x_1$ and the vertical distance $y_1$ between the target 210 and the radar unit 201 can be calculated based on $d_1$ and $\theta_1$. The horizontal distance $x_2$ between the camera unit 202 and the target 210 is equal to $(x_1-x)$, and the vertical distance is $y_2$. Since $y_1=y_2$, the distance $d_2$ between the target 210 and the camera unit 202 can be obtained based on $x_2$ and $y_2$. In one embodiment, the focus of the camera unit 202 is adjusted according to the distance $d_2$ and the orientation relation $\theta_2$ between the target 210 and the camera unit 202.

For example, the distance x between the radar unit 201 and the camera 202 is equal to 0.1 meters, and the radar unit can detect the target is at $d_1$=4.2 meters and $\theta_1$=30°.

First, calculate the horizontal distance $x_1$ between the radar unit 201 and the target 210, that is $x_1=d_1 * \sin \theta_1$=4.2*sin 30°=2.1 meters.

Then, calculate the vertical distance $y_1$ between the radar unit 201 and the target 210, that is $y_1=d_1 * \cos$ 30°=3.637 meters.

The vertical distance $y_2$ between the camera unit 202 and the target 210 is equal to the vertical distance $y_1$ between the radar unit 201 and the target 210, that is, $y_2=y_1$=3.64 meters.

The horizontal distance $x_2$ between the camera unit 202 and the target 210 is equal to the horizontal distance $x_1$ between the radar unit 201 and the target 210 minus the distance x between the radar unit 201 and the camera unit 202, that is $x_2=x_1-x$=2.1-0.1=2 meters.

Based on the vertical distance $y_2$ and the horizontal distance $x_2$ between the camera unit 202 and the target 210, the distance $d_2$ and orientation $\theta_2$ between the target 210 and the camera unit 202 can be obtained. Tan $$\theta_2 = \frac{x_2}{y_2} = \frac{2}{3.64} = 0.55,$$

therefore, $\theta_2$=28.81°, and $$d_2 = \frac{y_2}{\cos \theta_2} = \frac{3.64}{\cos 28.81°} = 4.19 \text{ meters}.$$

Therefore, based on the first positional information of the target 210, the focal length of the camera unit 202 is configured at an orientation of 28.81° with respect to the camera unit 202 at a distance of 4.19 meters.

Figure 3A:
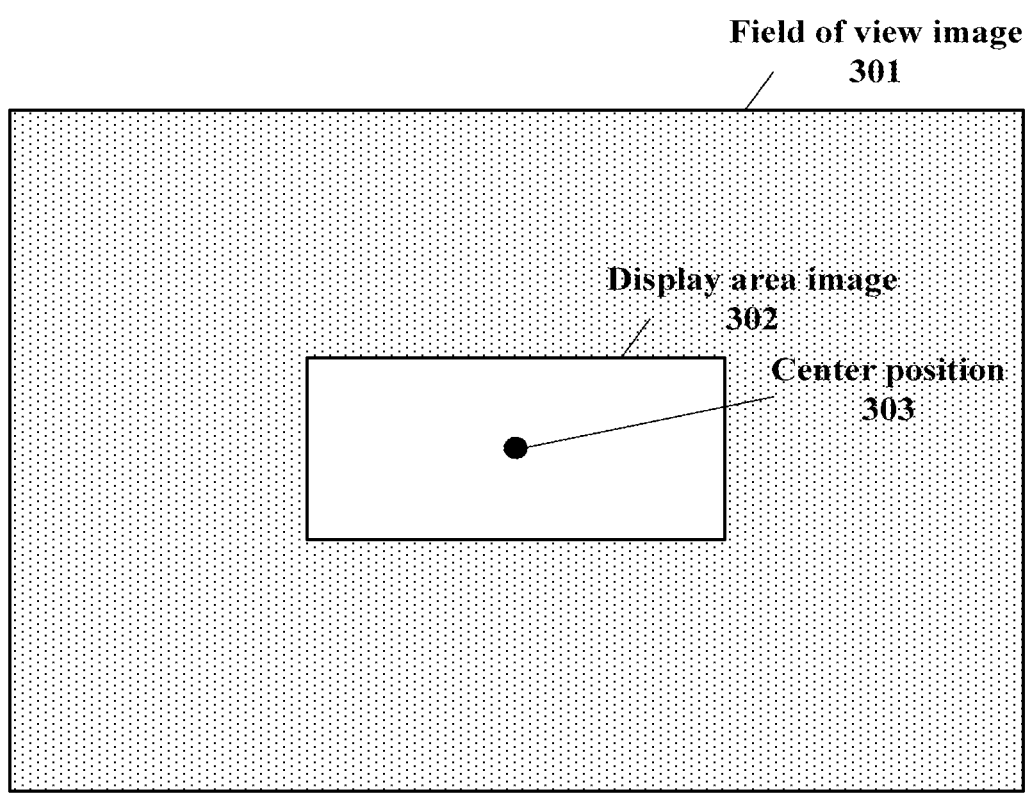
FIGS. 3A,3B and 3C are schematic diagrams of the method in FIG. 1.
Figure 3B:
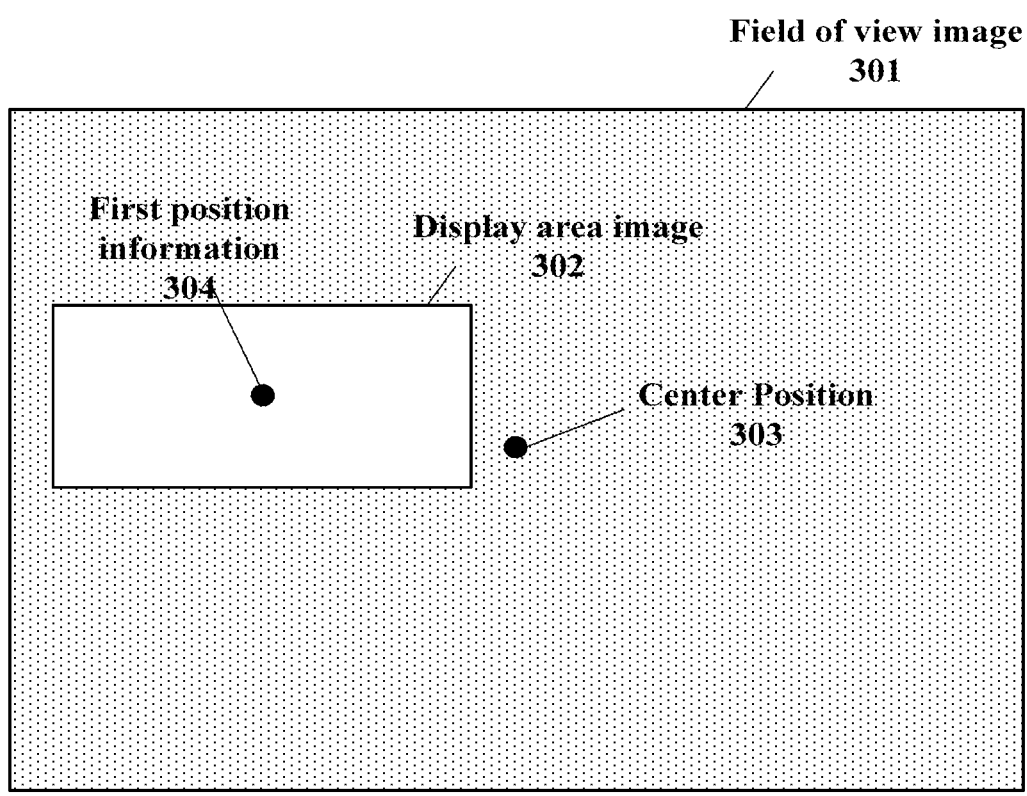
Figure 3C:
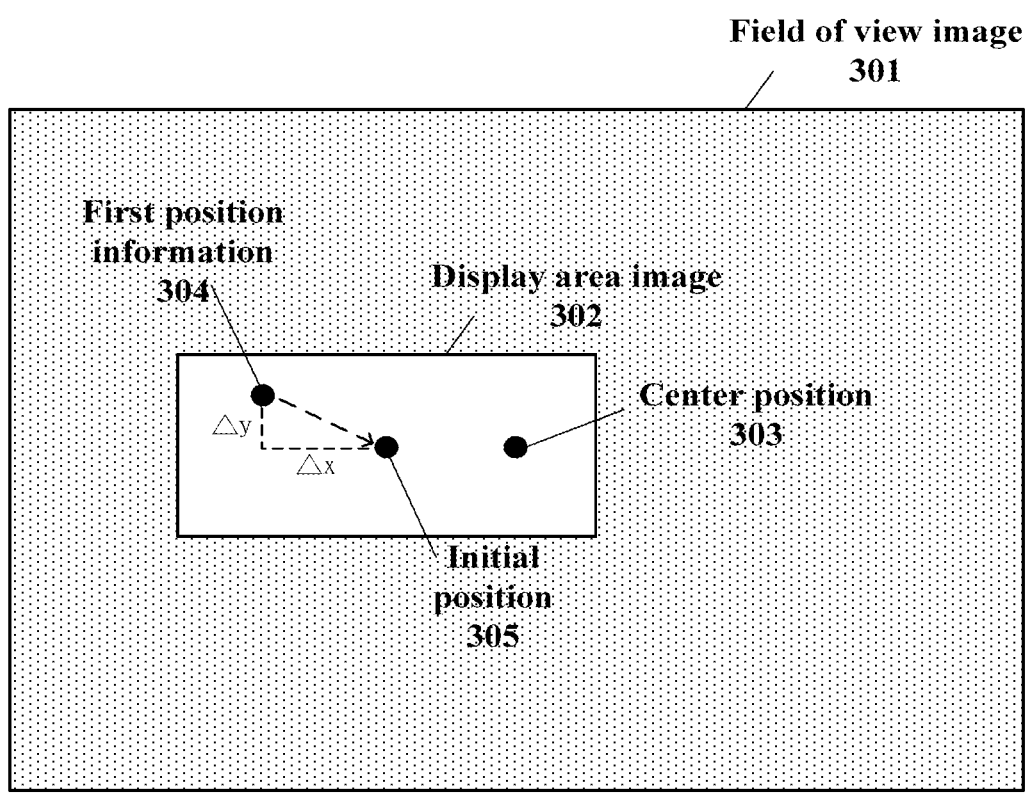

FIG. 3A-FIG. 3C are schematic diagrams showing the target tracking method.

The images obtained by the camera unit comprise a field of view image 301 and a display area image 302, wherein the field of view image 301 is the imaging range of the sensor of the camera unit, and the display area image 301 is the image output by the camera unit to other devices. In this embodiment, other devices comprise display devices. For example, the field of view image 301 of a 12-megapixel camera has a resolution of 1920*1080 p. According to the above, the field of view image 301 has a much greater resolution than the display area image 302. Therefore, by adjusting the position of the display area image 302 in the field of view image 301, it is possible to achieve centering of a target in the display area image 302. In this way, the effect of centering the target in the display area image 302 can be achieved without moving the orientation of the lens to align or track the target.

As shown in FIG. 3A, at step S101, the display area image 302 is centered on the center position 303 of the field of view image 301.

At step S102, the first positional information 304 of the target 210 is obtained through the radar unit 201. Thus, the central position of the display area image 302 is adjusted from the original central position 303 of the field of view image 301 to the first positional information 304 according to the first positional information 304 as shown in FIG. 3B.

At step S103, the camera unit 202 determines whether the target is a human body.

If the target is determined as a human body, the face position of the target 210 is obtained as the initial position 305. If the initial position 305 is not consistent with first positional information 304, i.e., if the initial position 305 is not at the center of the display area image 302, the horizontal offset distance $\Delta x$ and the vertical offset distance $\Delta y$ between the initial position 305 and the first positional information 304 are obtained. In this embodiment, the horizontal offset distance $\Delta x$ and the vertical offset distance $\Delta y$ are used to apply compensation to the radar unit 201, and the center position of the display area image 302 is adjusted according to the compensation. As shown in FIG. 3C, the initial position 305 is used as the center of the display area image 302, and the radar unit 201 and the camera unit 202 are controlled to perform face tracking on the target 210.

Figure 4:
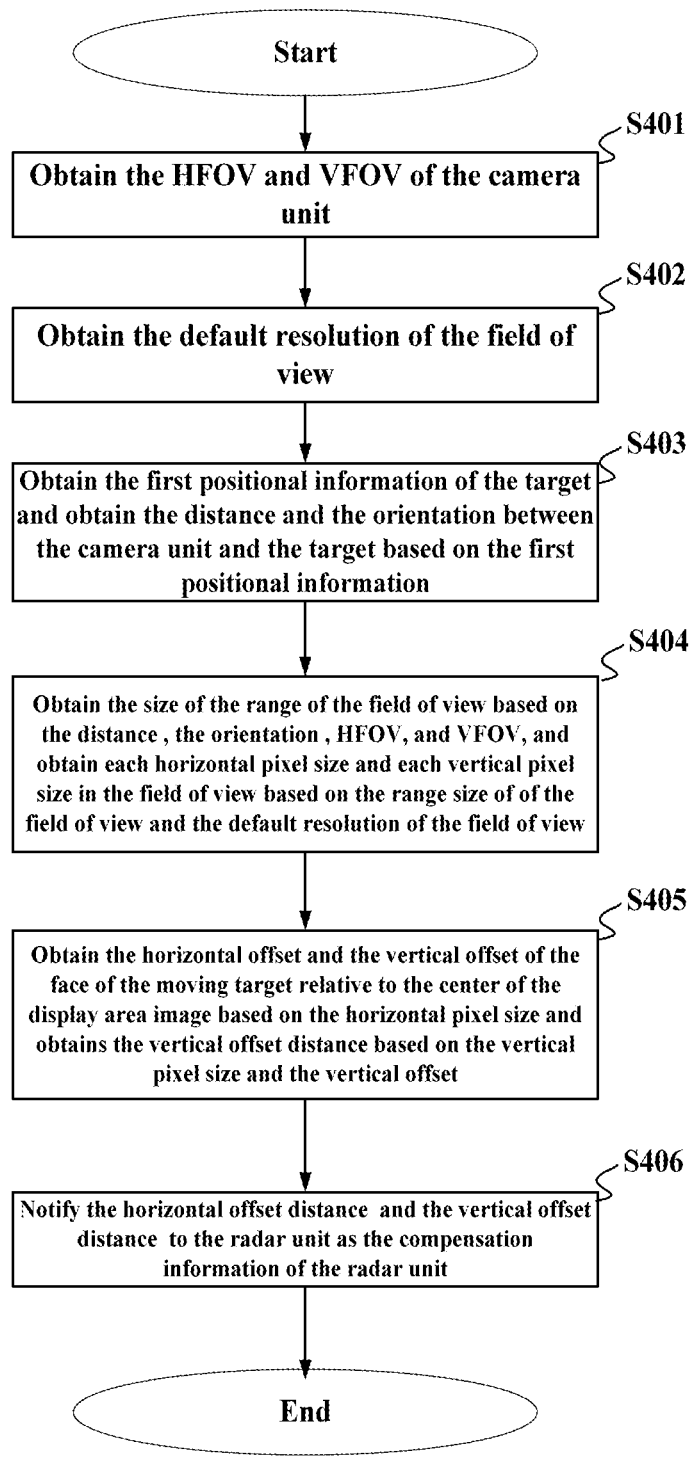
FIG. 4 is a flowchart for obtaining compensation of direction in the method of FIG. 1.

FIG. 4 shows a flow chart for obtaining tracking compensation in the target tracking method.

At step S401, the target tracking device obtains the Horizontal Field of View (HFOV) and the Vertical Field of View (VFOV) of the camera unit.

At step S402, the target tracking device obtains the default resolution of the field of view.

At step S403, the target tracking device obtains the first positional information of the target through the radar unit, and obtains the distance $d_2$, the orientation $\theta_2$ between the camera unit and the target based on the first positional information.

At step S404, the target tracking device obtains the size of the range of the field of view based on the distance $d_2$, the orientation $\theta_2$, HFOV, and VFOV, and obtains each horizontal pixel size and each vertical pixel size in the field of view based on the range size of the field of view and the default resolution of the field of view.

At step S405, when the face of the target is not located in the center of the display area image, the target tracking device obtains the horizontal offset and the vertical offset of the face of the target relative to the center of the display area image based on the horizontal pixel size and obtains the vertical offset distance based on the vertical pixel size and the vertical offset.

At step S406, the target tracking device notifies the radar unit as to compensation required for the horizontal offset distance Δx and the vertical offset distance Δy.

In this embodiment, the accuracy of the radar unit detection is enhanced by continuous detection by the radar unit and applying compensation continuously.

Figure 5:
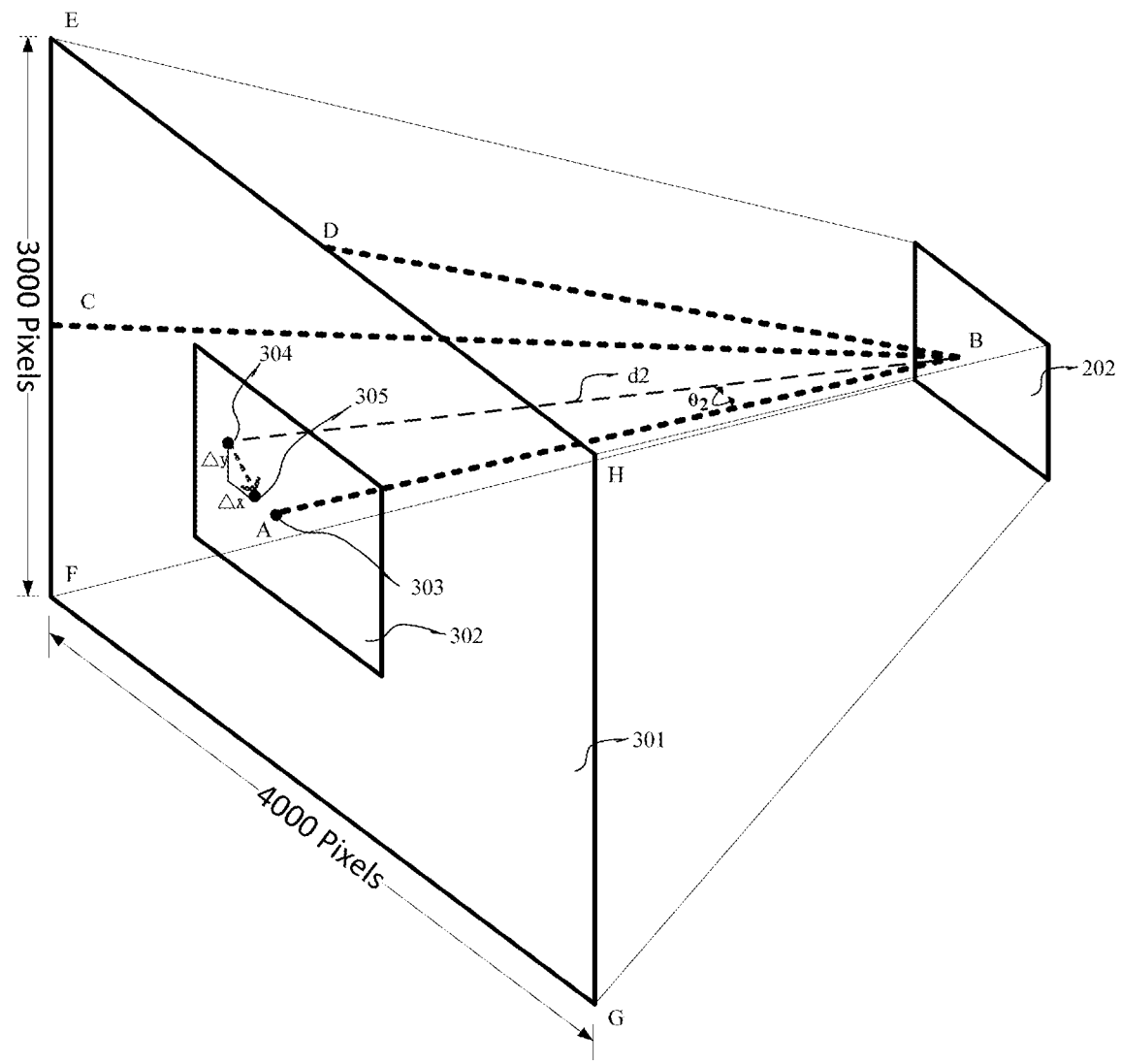
FIG. 5 is schematic diagram of the compensation in direction of FIG. 4 being calculated.

FIG. 5 shows an example of calculating required compensation for the target tracking method.

In this example, HFOV is 104°, $$\angle ABC = \frac{1}{2}HFOV = 52°,$$

VFOV is 96°, and $$\angle ABD = \frac{1}{2}VFOV = 48°.$$

The field of view image 301 of the display device has a resolution of 12 million pixels (4000*3000). After obtaining the first positional information 304 of the target through the radar unit (not shown in the FIG. 5), it is known that the distance $d_2$ between the camera unit 202 and the target is 4.19 meters and the orientation $\theta_2$ is 28.81°. After calculation, it is known that the vertical distance from the camera unit 202 to the target is $\overline{AB}$, in length and $\overline{AB}=d_2*\cos\theta_2=4.19$ meters*cos 28.81°=3.64 meters.

The length of $\overline{AC}$ can be calculated from the triangle ABC, where $$\angle ABC = \frac{1}{2}HFOV = 52°$$

and the length of $\overline{AB}$ is 3.64 meters. The horizontal offset distance Δx in the display area image can be obtained by image processing techniques, and in this example, Δx is 100 pixels, so that Δx in this example is 100 pixels=0.2 meters. Similarly, $$\angle ABDC = \frac{1}{2}VFOV = 48°,$$

and the length of $\overline{AB}$ is 3.64 meters. Therefore, the length of $\overline{AD}$ can be calculated from the triangle AND, the length of $\overline{AD}$=the length of $\overline{AB}$*tan 48°=3.64 meters*1.11=4.04 meters=1500 pixels. Therefore, each pixel in the y-direction represents 0.003 meters. The image processing technology can obtain the vertical offset Δy in the display area image. In this example, Δy is 20 pixels, so Δy of this example is 20 pixels=20*0.003=0.06 meters. The image processing technique can obtain the vertical offset distance Δy in the display area image.

Figure 6:
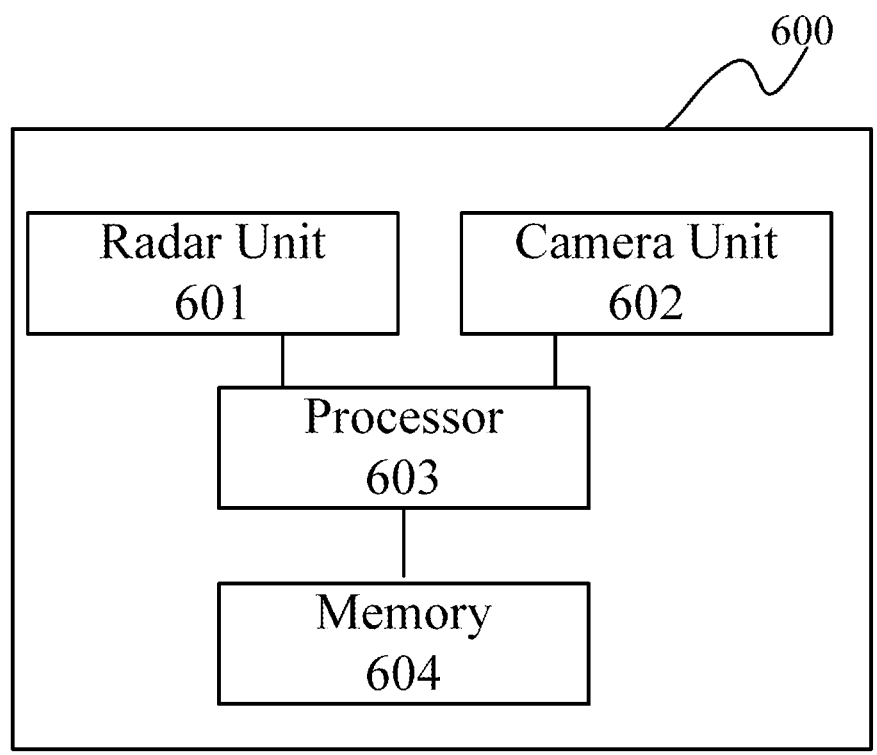
FIG. 6 is a block diagram of the apparatus of FIG. 2 for tracking target.

FIG. 6 is a block diagram of a target tracking device 600. As shown in FIG. 6, the target tracking device 600 comprises a radar unit 601, a camera unit 602, a processor 603, and a memory 604.

The radar unit 601 is used to detect a target, and the camera unit 602 is used to acquire a display area image comprising the target. The memory 604 is used to store at least one computer program, the computer program comprising instructions executed by the processor 603 such the processor 603 implements the method of the embodiments of FIGS. 1 to 5.

The embodiments shown and described above are only examples. Many details found in the relevant art are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A tracking method applied in a device, the device comprising a radar unit and a camera unit, the method comprising:
    obtaining first positional information of a target through the radar unit;
    obtaining an image of a display area comprising the target by the camera unit based on the first positional information;
    determining whether the target is a human body based on the image of the display area;
    obtaining an initial position of a face of the target in the image of the display area when the target is determined to be human body;
    determining whether the initial position is at a center position of the image of the display area;
    obtaining compensation information and apply the compensation information to the radar unit based on the initial position and the center position if the initial position is determined not at the center position of the image of the display area, wherein obtaining compensation information further comprises:
    obtaining horizontal field of view and vertical field of view of the camera unit;
    obtaining a default resolution of field of view of the camera unit;
    obtaining a distance $d_2$, the orientation $\theta_2$ between the camera unit and the target based on the first positional information;
    obtaining a size of a range of the field of view based on the distance $d_2$, the orientation $\theta_2$, the horizontal field of view, and the vertical field of view;
    obtaining each horizontal pixel size and each vertical pixel size in the field of view based on the size of the range of the field of view and the default resolution of the field of view;
    obtaining a horizontal offset and a vertical offset of the face of the target relative to the center of the image of the display area based on the horizontal pixel size;
    obtaining a vertical offset distance based on the vertical pixel size and the vertical offset;
    obtaining a horizontal offset distance based on the horizontal pixel size and the horizontal offset;
    using the vertical offset distance and the horizontal offset distance as the compensation information; and
    controlling the radar unit and the camera unit to track the target based on the compensation information.

2. The tracking method of claim 1, wherein obtaining an image of a display area comprising the target by the camera unit based on the first positional information further comprises:
    obtaining the image of the display area from the image of the field of view based on the first positional information.

3. The tracking method of claim 2, wherein obtaining the image of the display area from the image of the field of view based on the first positional information further comprises:
  obtaining a distance between the radar unit and the camera unit; and
  obtaining the image of the display area based on the distance and the first positional information.

4. The tracking method of claim 1, wherein the method further comprises the steps:
  adjusting the image of the display area according to the horizontal offset distance and the vertical offset distance to make the initial position at the center position of the image of the display area.

5. A tracking device, the tracking device comprising:
  a radar unit;
  a camera unit;
  a processor; and
  a non-transient memory configured for storing at least one computer program, wherein the at least one computer program comprises instructions which are executed by the processor, and performs a method comprising:
    obtaining first positional information of a target through the radar unit;
  obtaining an image of a display area comprising the target by the camera unit based on the first positional information;
  determining whether the target is a human body based on the image of the display area;
  obtaining an initial position of a face of the target in the image of the display area when the target is determined to be human body;
  determining whether the initial position is at a center position of the image of the display area;
  obtaining compensation information and apply the compensation information to the radar unit based on the initial position and the center position if the initial position is determined not at the center position of the image of the display area, wherein obtaining compensation information further comprises:
  obtaining horizontal field of view and vertical field of view of the camera unit;
  obtaining a default resolution of field of view of the camera unit;
  obtaining a distance $d_2$, the orientation $\theta_2$ between the camera unit and the target based on the first positional information;
  obtaining a size of a range of the field of view based on the distance $d_2$, the orientation $\theta_2$, the horizontal field of view, and the vertical field of view;
  obtaining each horizontal pixel size and each vertical pixel size in the field of view based on the size of the range of the field of view and the default resolution of the field of view;
  obtaining a horizontal offset and a vertical offset of the face of the target relative to the center of the image of the display area based on the horizontal pixel size;
  obtaining a vertical offset distance based on the vertical pixel size and the vertical offset;
  obtaining a horizontal offset distance based on the horizontal pixel size and the horizontal offset;
  using the vertical offset distance and the horizontal offset distance as the compensation information; and
  controlling the radar unit and the camera unit to track of the target based on the compensation information.

6. The tracking device of claim 5, wherein obtaining an image of a display area comprising the target by the camera unit based on the first positional information further comprises:
  obtaining the image of the display area from the image of the field of view based on the first positional information.

7. The tracking device of claim 6, wherein obtaining the image of the display area from the image of the field of view based on the first positional information further comprises:
  obtaining a distance between the radar unit and the camera unit; and
  obtaining the image of the display area based on the distance and the first positional information.

8. The tracking device of claim 5, wherein the method further comprises the steps:
  adjusting the image of the display area according to the horizontal offset distance and the vertical offset distance to make the initial position at the center position of the image of the display area.

* * * * *